Feb. 7, 1939.  W. HOMOKY  2,146,431
METHOD OF AND MEANS FOR GENERATING STEAM
Filed Nov. 27, 1937
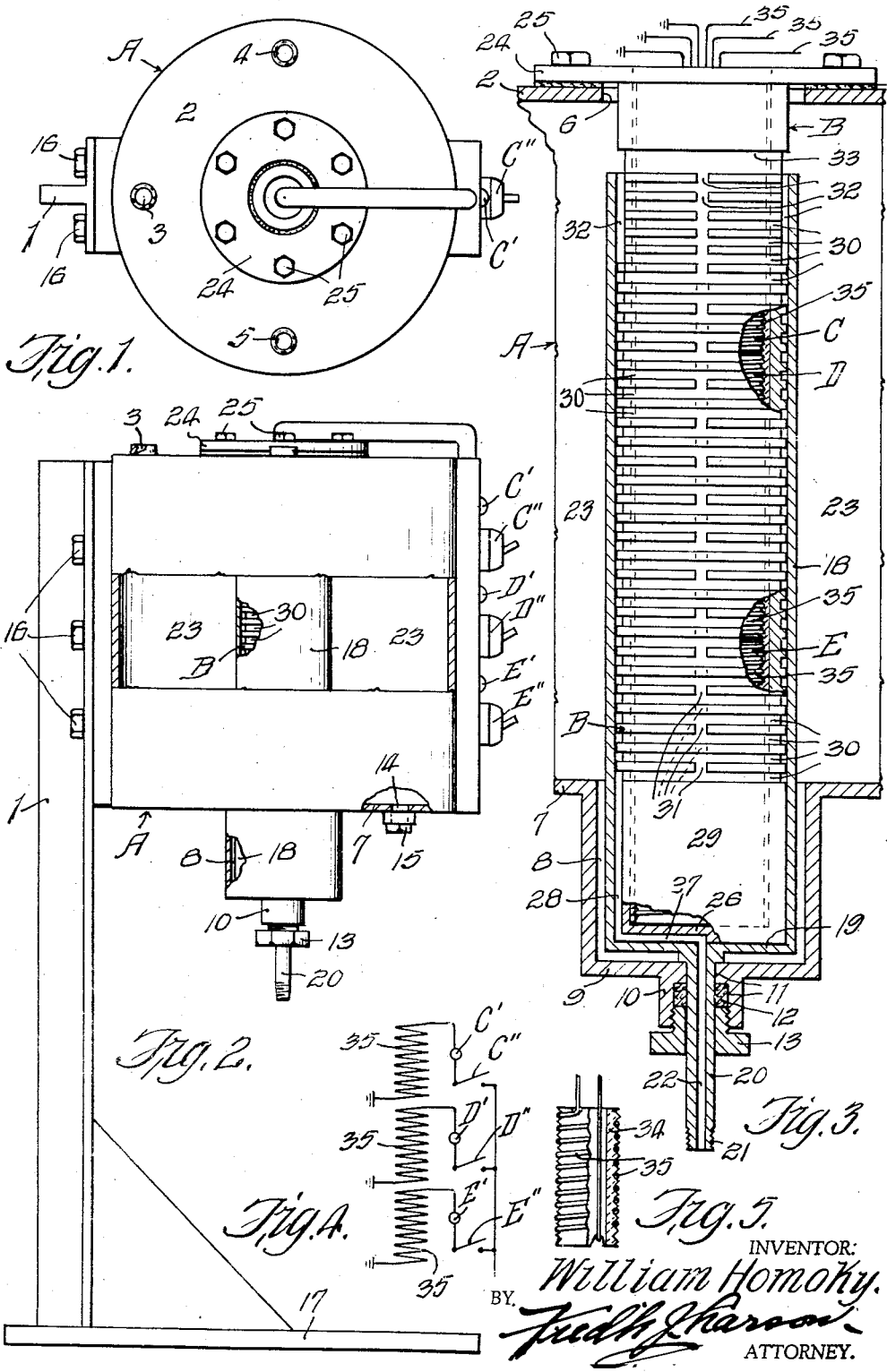
INVENTOR:
William Homoky.
BY
ATTORNEY.

Patented Feb. 7, 1939

2,146,431

UNITED STATES PATENT OFFICE 2,146,431

METHOD OF AND MEANS FOR GENERATING STEAM

William Homoky, St. Louis, Mo.

Application November 27, 1937, Serial No. 176,863

6 Claims. (Cl. 219—39)

My invention relates to the method of and device for generating steam.

The object of the invention is to provide a device which will instantaneously convert a small stream of water into steam to be transmitted from a container, or boiler surrounding heating means for use in connection with any desired type of device, or apparatus requiring steam to render the same operative.

Another object of the invention is the provision of a steam generating device which possesses advantages in the points of simplicity and efficiency, comparatively inexpensive in the cost of manufacture, portable if desirable, and easily attachable to any desired type of support therefor.

A further object of the invention resides in a novel heating unit, as a whole, which is contained within a boiler casing having a condensation sump and together providing a steam chamber surrounding such heating unit, and into which chamber steam is discharged from between a heating cylinder and a jacket cylinder therefor directly into the upper end of the steam chamber to be dispensed therefrom, as desired.

A still further object of the invention is the provision of a heating cylinder for an electrical heating unit, or units, which is provided upon its outer periphery with a water inlet passage communicating with spaced circumferential, vertically connected, steam grooves along the length of the heating cylinder.

With the above and other objects in view, the invention consists in the novel features of construction, arrangement and combination of parts hereinafter more fully described and finally pointed out in the claims hereto appended.

Referring to the accompanying drawing forming a part of this specification, wherein like characters of reference denote similar parts throughout the several views:

Fig. 1 is a top plan view of the steam generator.

Fig. 2 is a side elevation of the steam generator with a portion thereof broken to show the steam chamber.

Fig. 3 is a view partly in side elevation and partly in sectional view showing the heating unit structure as a whole positioned in a boiler casing.

Fig. 4 is a diagrammatic view showing the conductors which surround the electrical heating cores, the pilots and the switches of three separate electrical heating elements.

Fig. 5 is a detail of one of the electrical heating elements.

In carrying out the invention, I employ a suitable boiler casing designated generally as A, as will be clearly apparent from Figs. 1 and 3, and which is suitably secured to a suitable support 1.

The upper wall 2 of the boiler casing is provided with a suitable steam outlet opening 3, to which may be connected any suitable fitting, not shown, for transmitting steam to any device, or apparatus capable of using the steam to render same operative for its particular use. Also, the top 2 of the boiler casing may be provided with suitable openings 4 and 5 to receive suitable connections, such as an altitude gauge and a safety valve, respectively, not shown. The top wall 2 of the boiler casing is also provided with a central opening 6 to permit insertion of heating means into the boiler, as shown in Fig. 1.

The lower, or bottom wall 7 of the boiler casing A is provided with a suitable central downwardly projecting condensation sump 8. The sump is provided on its lower wall 9 with a suitable boss 10 provided with a suitable opening 11 to receive a suitable packing 12 and a packing gland 13, as shown in Fig. 1. The bottom wall 7 of the boiler is also provided with a suitable drain opening 14 adapted to receive any suitable fitting, or a plug 15.

The boiler casing, it will be understood, may be secured to any type of support 1 by means of fastening devices 16. The support shown, for illustrative purpose only, is an upright standard type of support provided with a foot 17 to stand upon a floor.

A suitable jacket cylinder 18, which will permit of thermal transfer and serving as a wall, is provided with a bottom wall 19 from which a stem 20 projects downwardly. The end of the stem 20 is provided with screw-threads 21 for connection to a suitable liquid, or fluid feed line, not shown. The stem 20 is provided with a longitudinal bore 22 serving as a liquid or fluid inlet passage communicating with the interior of the wall. The jacket cylinder 18 is positioned within the boiler casing A with its lower end disposed in the condensation sump 8 and with the stem 20 thereof passing through the boss opening 11, packing 12 and gland 13. The threaded end of the stem is disposed a suitable distance below the gland 13, as shown in Fig. 1. This arrangement supports the jacket cylinder 18 centrally of the condensation sump 8 and as the condensation sump is of greater inside diameter than the outside diameter of the jacket cylinder 18, there is ample space surrounding the lower end of the jacket cylinder 18 to collect condensation, as will be clearly apparent from Fig. 3.

An annular steam chamber 23 is formed around the jacket cylinder 18.

A suitable heating cylinder, which will permit of thermal transfer, will now be described.

The heating cylinder designated generally as B, is open at its top end only. The top end of the heating cylinder is flanged outwardly, as at 24. The heating cylinder B is inserted into the jacket cylinder 18 and has a tight fit therewith. The flange 24 on the heating cylinder B is secured to the top wall 2 of the boiler casing by means of suitable fastening devices 25 to close the opening 6 in the boiler casing.

The heating cylinder B has its bottom wall 26 provided with a liquid, or fluid groove, or channel 27 which terminates in a vertical groove, or channel 28. The upper end of the groove, or channel 28 extends upwardly a suitable distance on the lower smooth portion 29 of the heating cylinder B.

A series of suitable vertically spaced circumferential grooves 30 are formed on the outer wall of the heating cylinder B. The grooves extend to a point near the top of the heating cylinder B. The vertical groove 28 communicates at its upper end with the lowermost circumferential groove 30. Each circumferential groove 30 starting with the lowermost groove, communicates with the next groove above by means of vertical grooves 31. The grooves 31 alternate so that they connect the circumferential groove 30 in pairs on one side of the heating cylinder, and, in alternate pairs on the opposite side of the heating cylinder B. A suitable number of the uppermost circumferential grooves 30 are connected by a plurality of vertical grooves 32 permitting more rapid escape of steam into the steam chamber 23 of the boiler casing than if its travel upwardly were restricted to a single vertical groove. Due to the fact that grooved heating cylinder B is tightly fitted into the jacket cylinder 18 which serves as a well therefor, it is readily apparent that the grooves 27 and 28 serve as liquid or fluid passages at the lower end thereof, that a plurality of the lowermost circumferential grooves 30 and their vertical connecting grooves 31 serve as steam passages and that the remaining uppermost circumferential grooves 30 and their vertical connecting grooves 31 and 32 serve as superheated, or dry steam passages. From the vertical passages formed by the grooves 32, the dry or superheated steam is discharged directly into the annular steam chamber 23 of the boiler casing which surrounds the heating jacket cylinder 18 and the upper part of the heating cylinder B. The aforesaid grooves provide a continuous channel up to a predetermined position on the heating cylinder and from there a plurality of sets of vertically aligned grooves form discharge passages to an uppermost relatively wide circumferential groove 33 on the heating cylinder, which groove is exposed to the steam chamber 23.

A plurality of suitable electrical heating units designated, generally as C, D and E are suitably disposed within the heating cylinder B and are suitably held against displacement therein by such means, for instance as pulverized lava which serves as an insulating binder between the heating units and the heating cylinder in the usual manner.

Each heating unit is shown as comprising a suitable core 34 and a conductor 35. The conductor of each heating unit is electrically connected with suitable pilots C', D' and E' and suitable switches C'', D'' and E'', respectively, in the usual well known manner. Separate switches are provided so that heat for heating the heating cylinder B may be controlled as needed, or desired.

In operation, all switches are initially turned on to cause the heating units to heat the heating cylinder B and the jacket cylinder 18 to the desired temperature, so that when liquid or fluid is injected through passages 27 and 28 through stem passage 22, it will travel upwardly on the heating cylinder B to be instantaneously converted into steam. The steam, of course, rises and is discharged into the steam chamber of the boiler casing in the form of superheated or dry steam.

Condensation that takes place flows down and into the sump 8 which is designed for the collection of condensation below the normal bottom of the boiler casing.

When steam pressure within the steam chamber 23 of the boiler casing reaches the desired altitude, one of the switches may be turned off. Steam pressure, it will be apparent, can be regulated as needed by switch control of the electric heating units and by the liquid or fluid flow into the stem passage 22.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. The method or process of generating steam or gas from liquid or fluid by means of an electrical heat exchange device which consists in causing the liquid or fluid to flow from an inlet to a lowermost flow path within the device, dividing the flow at the point of entrance to said flow path to cause a flow in two directions to a point opposite the entrance point in said flow path, causing the merged flow at the latter point to be elevated to a flow path at a higher elevation, repeating the divided flow in two directions to a common outlet at the opposite side of said last mentioned flow path and repeating the process at definitely separated higher elevations until finally discharged in the form of dry steam or gas from the heat exchange device.

2. A device of the class described having, in combination, a boiler casing, a condensation sump formed centrally of and projecting downwardly from the floor of the boiler casing, a cylinder seated in the sump to provide an annular liquid receiving space and the cylinder projecting upwardly into the boiler casing and stopping short of the top wall thereof, a heating cylinder positioned in the first mentioned cylinder and projecting upwardly for attachment to the casing head to form an annular steam chamber within the casing, said heating cylinder having groove connected vertically spaced circumferential grooves formed on its outer periphery to form small flow passages to cause water and steam to flow in two directions in each passage between the walls of the two cylinders, a vertical water inlet groove formed on the wall of the heating cylinder and leading to the lowermost circumferential groove, a plurality of vertically disposed steam outlets leading from a plurality of the uppermost circumferential grooves to said steam chamber.

3. A steam generating device having, in combination, a casing, a heat exchange structure including an outer cylinder and an inner cylinder disposed vertically and centrally of the casing to provide an annular steam chamber within the casing, a condensation sump projecting below the floor of the steam chamber and surrounding the lower end of the said outer cylinder to provide an annular liquid receiving space in communication with the lower end of the annular steam chamber, a plurality of individually switch controlled electrical heating units housed within the inner cylinder, a multiplicity of vertically spaced circumferentially arranged grooves formed on the wall thereof, adjacent pairs of said grooves being connected by upright grooves and each upright alternate groove being disposed on opposite sides of the inner cylinder, said circumferential grooves providing two way flow paths from one vertical groove to the opposite alternate vertical groove and said grooves together providing steam passages between the two cylinders, a water inlet leading to the lowermost circumferential groove, and a plurality of vertical steam outlets leading from a plurality of the uppermost circumferential grooves into the annular steam chamber at the upper end thereof.

4. A heat exchange unit for electrically heated steam generators having, in combination, a heating cylinder closed at its lower end, a groove formed on the lower face of the cylinder, a groove formed longitudinally of the cylinder communicating with the lower facial groove, a series of parallel vertically spaced horizontally disposed grooves formed circumferentially on the cylinder, adjacent pairs of circumferential grooves being connected by vertical grooves alternating on opposite sides of the grooved cylinder, a plurality of electrical heating units housed within the heating cylinder, and a second cylinder adapted to receive the heating cylinder so that each circumferential groove will form two way flow passages from alternate vertical grooves on one side of the heating cylinder to alternate vertical grooves on the opposite side of the heating cylinder.

5. A device of the class described having, in combination, a casing, means forming a condensation sump centrally of and projecting below the floor of the casing, a cylinder having a closed bottom and a depending nipple and an open top supported in the sump to provide an annular space and projecting upwardly into the casing and stopping short of the top of the casing, a heating cylinder having a closed bottom secured to and depending from the top head of the casing and in tight wall contact with the first mentioned cylinder, said cylinders together causing an annular steam chamber to be formed within the casing, electrical heating units arranged in the heating cylinder, vertically spaced circumferential grooves formed on the heating cylinder, adjacent pairs of circumferential grooves being connected by vertical grooves in staggered relation on opposite sides of the heating cylinder to provide connected horizontally disposed two way flow passages at different elevations, a plurality of vertical outlets to the steam chamber connecting a plurality of the uppermost circumferential grooves, and means for admitting liquid or fluid between the cylinders to the lowermost circumferential groove.

6. A device of the class described having, in combination, a casing having an opening in the top wall thereof, a sump formed below the floor of the casing and the floor of the sump being provided with an opening, a heat radiating cylinder having an open top, a nipple projecting downwardly from said cylinder adapted to project through the opening in the floor of the sump and provide an annular space in the sump, a packing surrounding the nipple in said sump floor opening, a gland nut for holding the packing in position, a heat exchange cylinder having a closed bottom, an open top and a flange surrounding the open top, said heat exchange cylinder passing downwardly through the opening in the top wall of the casing and having tight telescopic engagement with the heat radiating cylinder and said cylinders together forming an annular steam chamber within the casing, fastening devices for securing the said flange to the top wall of the casing for closing the opening therein, that portion of the lower end of the heat exchange cylinder corresponding to the height of the sump having a vertical facial groove communicating at its lower end with a horizontal facial groove on the bottom of the heat exchange cylinder to provide a liquid or fluid passage communicating with the nipple, a series of vertically spaced horizontally disposed circumferential facial grooves formed on the heat exchange cylinder above the vertical facial groove and with the upper end of the vertical facial groove communicating with the lowermost circumferential groove, said vertically spaced circumferential grooves forming steam passages between the heat exchange cylinder and the heat radiating cylinder, adjacent pairs of circumferential grooves being connected by vertical facial grooves, said grooves being staggered on opposite sides of the heat exchange cylinder, and a plurality of the uppermost circumferential grooves being connected by a plurality of vertical facial grooves so as to provide a plurality of dry steam outlets into the upper end of the steam chamber.

WILLIAM HOMOKY.